May 14, 1963   J. S. SENEY   3,089,992
PRECISION FREQUENCY CONTROL
Filed May 9, 1960   3 Sheets-Sheet 1
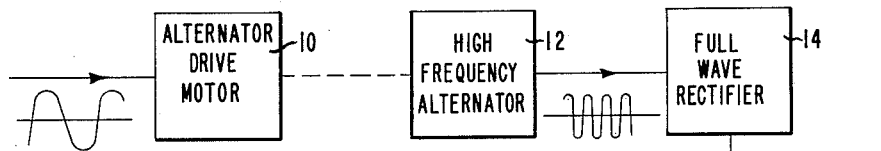
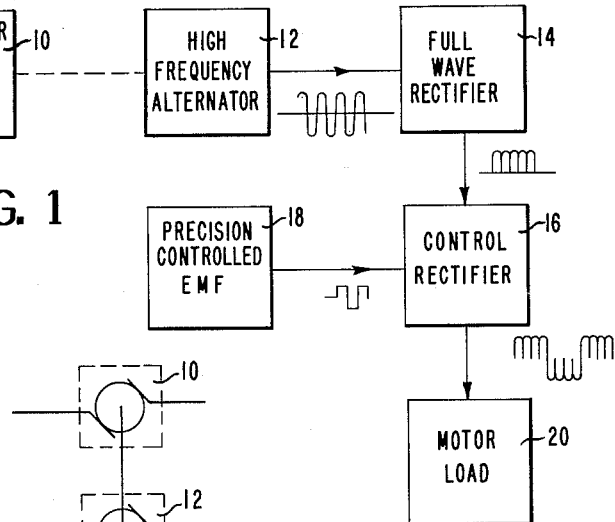
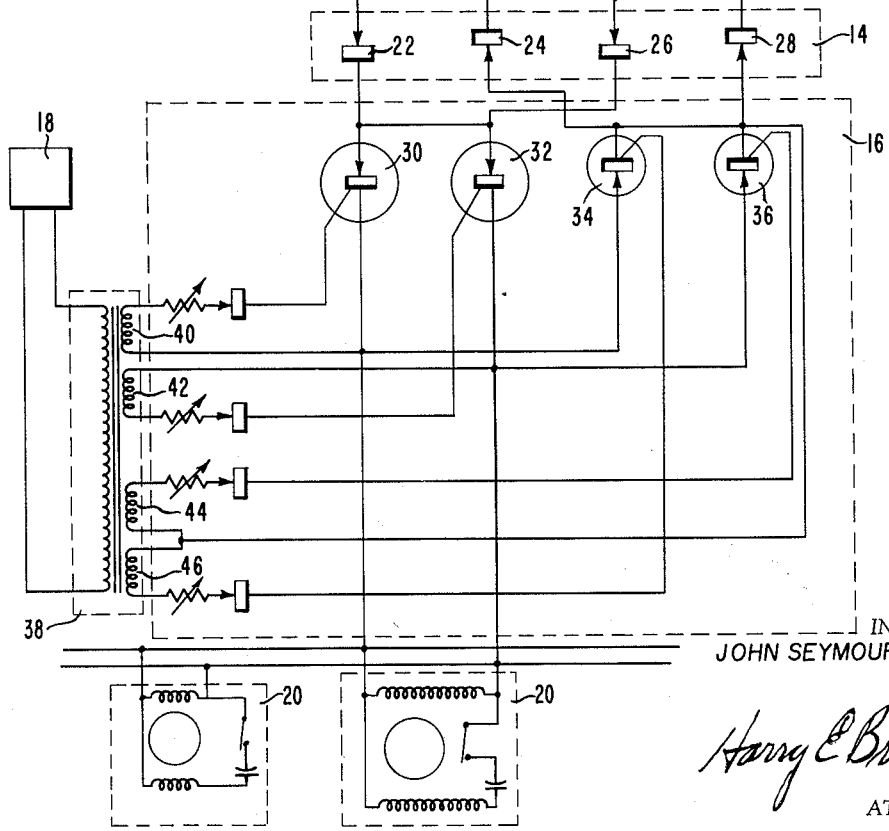
INVENTOR
JOHN SEYMOUR SENEY
*Harry E Braddock*
ATTORNEY May 14, 1963  J. S. SENEY  3,089,992
PRECISION FREQUENCY CONTROL
Filed May 9, 1960  3 Sheets-Sheet 2

INVENTOR
JOHN SEYMOUR SENEY

BY

ATTORNEY

United States Patent Office 3,089,992
Patented May 14, 1963

3,089,992
PRECISION FREQUENCY CONTROL
John Seymour Seney, Seaford, Del., assignor to E. I. du Pont de Nemours and Company, Wilmington, Del., a corporation of Delaware
Filed May 9, 1960, Ser. No. 27,734
9 Claims. (Cl. 318—171)

The present invention relates to the field of producing alternating currents of accurately controlled high frequency and applying such currents to electric motors for accurate control of their speed.

In many industrial applications where a multiplicity of synchronous motors are used, it is frequently necessary that the motors be precisely synchronized. In other applications, the precise speed control of a single synchronous motor is required. To obtain precise control, it is necessary that the frequency of the alternating current be precisely controlled. To do this by conventional means, for many motors, usually requires complicated and expensive equipment which is difficult to maintain and keep in precise adjustment.

Another method of speed control known in the field is the use of gas diodes (thyratrons) as controlled rectifiers. The normal method is to limit portions of the supply current by amplitude control or phase-shift control. The firing and recovery times of these diodes limit their use to below certain frequency limits and hence limit the speeds of motors used in such systems. The present invention overcomes such limitations and makes operations at frequencies up to about 80,000 c.p.s. possible and feasible.

An object of this invention is to provide an electrical system which uses a low-energy, precisely controlled electrical signal to modify high energy electrical power from a source whose frequency is poorly regulated, to generate, for direct application to an electrical motor, high energy, high frequency well regulated power.

Another object of this invention is to provide improved precise fixed-speed control of synchronous electric motors using poorly regulated, high-energy power and an accurately regulated low-energy control signal.

Another object is to provide precise variable-speed control of synchronous electric motors using poorly regulated, high-energy power and a precisely-controlled low-energy control signal.

Yet another object is the provision of an improved arrangement for generation of precise-frequency A.C. power from D.C. power using a low-energy precision signal, and for supplying the power directly to a synchronous electric motor for accurate control of its speed.

Another object is a speed control system for electric motors which is highly effective, simple, low cost and essentially free from maintenance and undesirable power factor effects.

Another object of this invention is the provision of an arrangement for achieving precision speed control of synchronous electric motors using unregulated frequency high-energy power controlled by a low power precision signal of controlled frequency using a control rectifier.

Another object of this invention is the provision of an improved precision speed control system for a motor utilizing a poorly controlled high-energy power supply and a precision controlled E.M.F. signal and in which the rotor and stator of the motor itself are employed as a part of the control system.

This invention generally involves, in its preferred embodiment, a system for producing a resultant high energy alternating current having a variance in its range of cycle frequency of less than 0.1%, in which an alternating current having a variance in its range of cycle frequency of greater than 0.1% and a frequency of considerably greater than about 400 cycles per second is fed through a switching arrangement which is controlled by a low energy alternating current signal of a frequency less than approximately ¼ the average frequency of the high frequency current to be controlled, the said low energy alternating current signal having a variance in its range of cycle frequency of less than 0.1%, and applying the resultant high energy power directly to a synchronous motor for driving the motor at accurately controlled speeds.

Other objects and advantages will appear from a consideration of the specification and claims taken in conjunction with the accompanying drawings in which:

FIGURE 1 is a block diagram of a basic system, embodying features of my invention.

FIGURE 2 is a schematic circuit diagram of the system of FIGURE 1 using single-phase power, and illustrating the system used to drive and control a plurality of motors.

Figure 3:
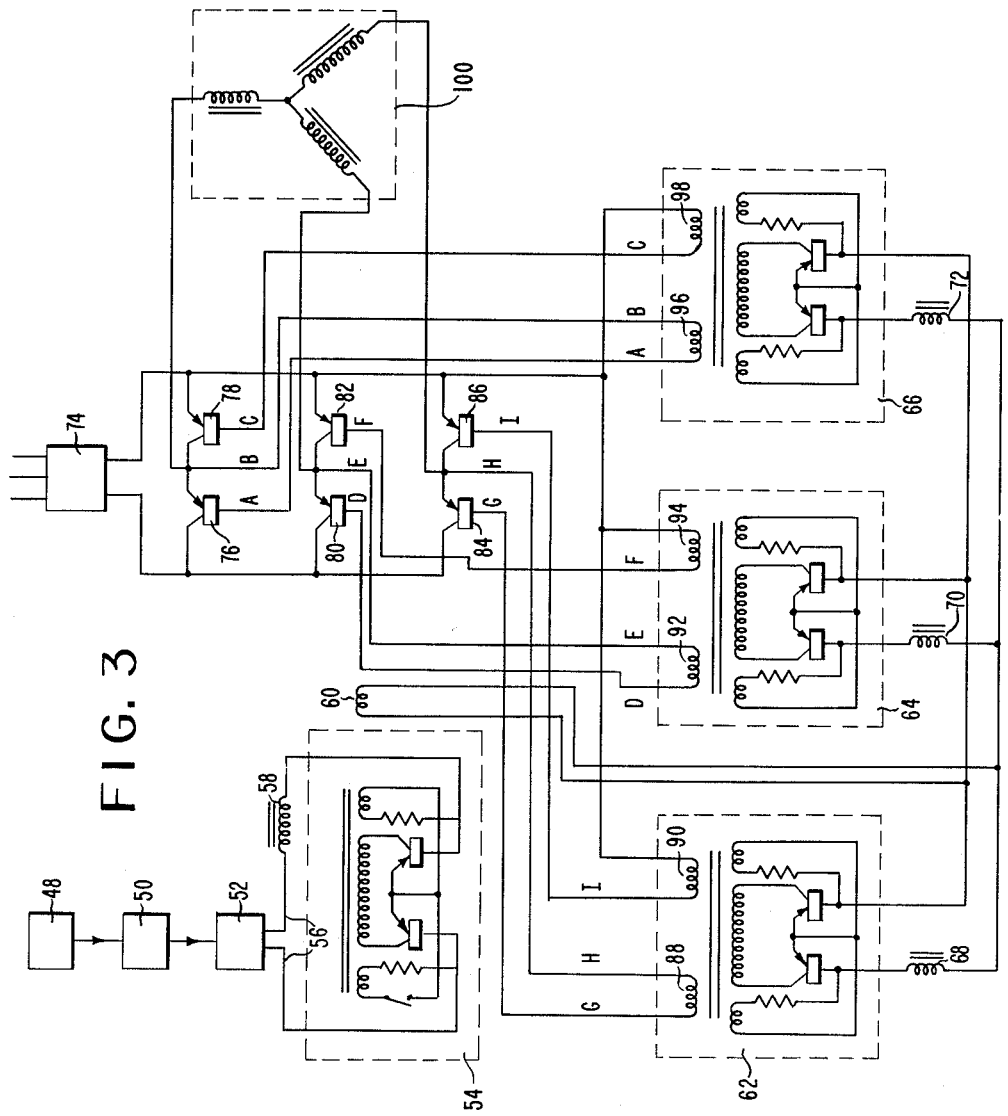
FIGURE 3 is a schematic circuit diagram of the system of FIGURE 1 using three-phase power.

Referring to the FIGURE 1 schematic embodiment, an alternator drive motor 10 is driven by any convenient source of power which may have poor frequency control. This motor mechanically drives a high frequency alternator 12. The output of the high frequency control alternator 12 is fed through a full wave rectifier 14. The output from the full wave rectifier is fed into the control rectifier 16 which is preferably of the solid state or semiconductor type, such as transistors or silicon controlled rectifiers. The control rectifier 16 is controlled by a precision controlled signal from a source 18, which signal may be either sinusoidal or preferably square wave in nature. The precisely controlled output from the control rectifier is fed directly to synchronous motor load 20 to maintain its constant speed. In a typical application, the power driving the alternator drive motor 10 has a frequency of 60 cycles per second plus or minus one cycle per second and drives a high frequency alternator which would give 800 cycles per second power plus or minus 13 cycles per second. The full wave rectifier 14 converts this high frequency power to full wave power all on the positive side. This full wave power appears as finite pulses of D.C. rather than constant voltage D.C.

The precision-controlled E.M.F. 18 controls the control rectifier 16, to convert the positive full-wave power from a continuous series of positive pulses to a precisely timed alternating series of positive and negative groups of pulses of D.C. Due to the impedance characteristics of the motor which cannot react with sufficient speed to the high frequency pulses, the alternate series of positive and negative groups of D.C. pulses are utilized by the motor as low frequency A.C., approximately square-wave power, whose frequency is dependent upon the precision of the controlled E.M.F. 18.

Each group of D.C. pulses comprises a series of high frequency finite pulses at such close time intervals that no integration or smoothing circuits are needed prior to applying the groups of pulses directly to the motor 20. This means that the undesirable power factor variations associated with such smoothing or integration networks are also avoided. It is not believed that the direct application of such power to operate and control a synchronous motor has been accomplished successfully heretofore.

Typical wave forms from each component are shown in FIGURE 1. The control rectifier passes current only when the control voltage is sufficiently positive. During the positive portion of the control signal cycle the output current of the rectifier is reduced to zero a number of times due to the drop between the high frequency D.C.

pulses. This produces a series of closely spaced or timed positive D.C. pulses when the control voltage is positive. By suitable arrangement of rectifier components, similar operation during the negative portion of the control voltage cycle can produce a closely spaced or timed series of negative D.C. pulses instead of merely dropping the output to zero. Due to the nature of the rectifiers used, when the rectifier is passing current during a given pulse it cannot be cut off by the control voltage but only by the dropping of the input voltage to zero. Consequently, it will be seen that the active timing control of the output power is exercised at the point when the precision control voltage, preferably of square wave form, swings sharply positive, which will produce a finite output power pulse during any portion of the input D.C. pulse to commence and control the timing of the new series of output pulses.

The precision-controlled signal may be obtained either from a fixed-frequency crystal or a precision frequency generator. Such devices are readily available with an accuracy of one part in 10,000,000.

If the output frequency were, for example, 60 cycles per second, and obtained directly from the 60 c.p.s. power line, it would vary ±1 c.p.s. or ±1.7%. However, in the arrangement of this invention, the accuracy is better than ±0.06 c.p.s. or ±0.1%.

An example of the low power required to precisely control a motor control arrangement embodying my invention is as follows: Modulated, unregulated 800 c.p.s., 170 volt, R.M.S., power was used to drive a ½ H.P. capacitor start, 4 pole, single phase 115 volt, 60 cycle induction motor. The precisely controlled 60 cycle power to the motor was 2.38 amps. at 68 volts R.M.S. or 157 watts R.M.S. The control power was 0.016 watt, or a control ratio of 10,000 to 1.

FIGURE 2 is a schematic circuit diagram of the system of this invention as applied to a single-phase power system for a plurality of motors. The operation of this system is as follows: the drive motor 10 mechanically drives the high-frequency alternator 12. The high-frequency output of the alternator 12 is fed through a full-wave rectifier 14 consisting of four rectifying crystals, 22, 24, 26, and 28. The output from these crystals are connected as shown to four silicon-controlled rectifiers, 30, 32, 34, and 36. The firing of silicon-controlled rectifiers is controlled by the signal applied to the gate of the rectifier.

The signal from the precisely controlled source 18 is applied to the primary coil 38 of a transformer. This signal can be either sinusoidal or square-wave, but the square-wave is preferred for the higher frequencies. As the polarity of the primary coil 38 reverses, the polarity of the four secondary coils 40, 42, 44, and 46 also change, thus feeding appropriate signals to the gates of the silicon-controlled rectifiers 30, 32, 34, and 36. As discussed in the preceding treatment of FIGURE 1, the control of these rectifiers by the precision signals applied to their gates produces an output of alternate groups or series of positive and negative pulses, each group or series precisely controlled as to its duration. These groups of finite pulses are supplied to the motor load 20, which due to its inductance and capacitance characteristics, utilizes them as low frequency alternating current whose frequency has been accurately controlled by the low-power, precise signal from source 18. A plurality of motors can be driven from such a system as shown. The full wave rectifier 14 can be replaced with a half-wave rectifier if desired.

This system can also be applied to a three-phase power supply. FIGURE 3 is the schematic diagram for such a system. A crystal 48 or other precision means for generating a high frequency signal is connected to a frequency divider 50 and amplifier 52 to bring the working signal fed to oscillator 54 to the desired frequency and power level. Oscillator 52 can be of any self-exciting type, the type shown being a square hysteresis loop magnetic oscillator. As is well known in the art, this type of self-exciting oscillator will oscillate at the frequency impressed upon leads 56, requiring negligible power. While oscillator 54 can operate from sinusoidal signals, square wave pulses are preferably used in the practice of this invention. A trigger-phase pulse shaper 58, any of those well known in the art, is inserted to generate sharp pulses to be fed to oscillator 54. Coil 60 picks up the oscillations of oscillator 54 and transmits the frequency signal to the three oscillators 62, 64, and 66, through phasing means 68, 70, 72. Thus oscillators 62, 64, 66 oscillate at the same frequency, but 120° out of phase.

Three phase power is supplied to a three-phase, full-wave rectifier 74 and thence, as shown to power transistors 76, 78, 80, 82, 84, and 86. The control signals to operate the appropriate phases are picked up by secondary coils 88, 90, 92, 94, 96, 98. The power to each phase is handled as previously set forth in the discussions of the operation of the FIGURE 1 and FIGURE 2 arrangements. The output current, is led to the output transformer 100, its frequency accurately determined by the frequency of the low-power signal and operation of the power transistors.

Figure 4:
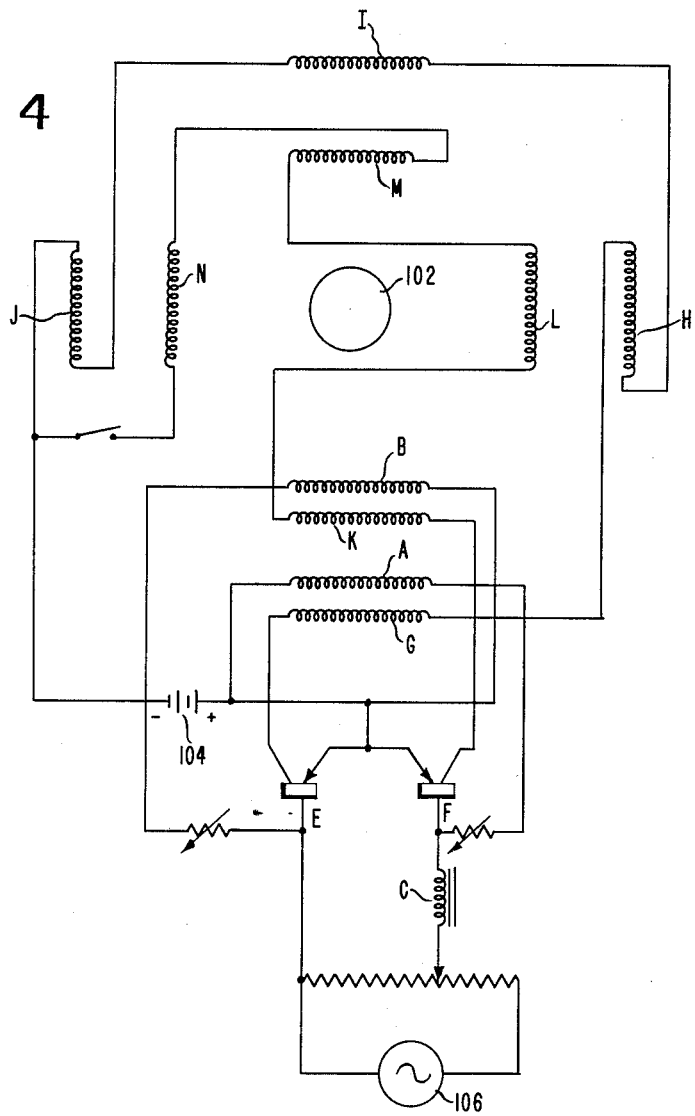
FIGURE 4 is a schematic circuit diagram of an alternate system embodying features of this invention.

FIGURE 4 is a showing of one phase of a two or more phase, 4 pole hysteresis synchronous motor and controls utilizing features of my invention in a somewhat different embodiment. In this arrangement, two sets opposed stator windings K, L, M, N, and G, H, I, J, each controlled by power transistor devices F and E, respectively, operate alternately to reverse the field direction of the disclosed phase of the stator windings. It will be seen that, by means of additional windings A and B interwound with field windings G and K, respectively, and cross-connected to the control signal circuits for the transistor devices, the stator windings function as oscillator coils of a self-exciting oscillator arrangement. The oscillator coils furnish power to the rotor 102 to cause it to rotate at a speed equal to the oscillator frequency as controlled or modified by the synchronizing or precision control signal from precision signal source 106. The disclosed circuit arrangement permits isolation of the loads of switches E and F so that accidental simultaneous operation will not damage them. This also eliminates the use of push-pull transformers to achieve this action.

Saturating reactor C is designed to have characteristics such that the oscillator frequency or motor frequency falls within the control limits of the precision frequency signal from source 106.

In operation, the arrangement of FIGURE 4 is similar to the system of FIGURE 2. The D.C. supply 104 produces an output comparable to the full-wave rectifier 14. The precision signal source 16 (FIGURE 2) and 106 (FIGURE 4) can be identical equipment. The resultant precisely controlled power which actuates the motor is an alternating series of positive and negative square waves which is utilized directly by the motor winding as a sinusoidal alternating current of the same frequency.

Applications of my invention are not limited to driving the output motor at a precisely controlled constant speed. By using a variable frequency oscillator, known to those skilled in the art, for generating the outputs of devices 18 of FIGURE 1, 16 of FIGURE 2, 54 of FIGURE 3, and 106 of FIGURE 4, the speed of the output motor is controlled simply and easily.

While I have shown and described my invention in connection with certain specific embodiments, it will be understood that other applications, and modifications may be made therein without departing from the spirit and scope of the invention as set forth in the following claims.

I claim:
1. An improved system for operating and precisely controlling the speed of a synchronous motor, comprising a first source of unregulated frequency high energy alternating current, rectifying means connected to said source for converting said current to a continuous series of finite direct current pulses, electronic valve means, having input and output terminals connected in series with said rectifying means and a synchronous electric motor, said electronic valve means having a control electrode, a second source of low energy alternating current, having a precisely controlled frequency, connected to said control electrode, said precisely controlled frequency less than said frequency average of the current provided by said first source by a factor of at least 4 to 1, said valve means operating under control of said precisely controlled low energy alternating current to supply said motor directly with a series of precisely timed groups of closely spaced finite direct current pulses to drive and precisely control the speed of the motor.

2. An improved operating and speed control system for a plurality of synchronous motors, comprising a first power source of high energy alternating current of unregulated frequency, a rectifying means connecting said first source to an electronic valve device having input and output terminals and a control electrode, said rectifying means converting the high energy alternating current from said first source to a high energy continuous series of finite direct current pulses, circuit means connecting said input and output terminals of said electronic valve device between said rectifying means and a plurality of motors, a second power source of low energy alternating current of precisely controlled frequency substantially lower than the increased frequency of said high energy alternating current, and connected to said control electrode so that said valve device converts said high energy continuous series of direct current pulses into a series of precisely timed and spaced groups of direct current pulses for utilization by said motors as a precisely controlled high energy alternating current for operating and precisely controlling the speed of said motors.

3. An improved electrical synchronous motor control system for converting a high energy unregulated frequency alternating current to a high energy precisely controlled mechanical rotation, said system comprising a first means connected to a first power source of high energy unregulated frequency alternating current for converting said current to a high frequency current of at least 400 c.p.s., a switching means connected between said first means and a synchronous motor, an activating means cooperating with said switching means for causing said switching means to transmit directly to the synchronous motor a series of precisely timed groups of closely spaced finite direct current pulses at a group frequency of less than one fourth the frequency of said higher frequency current for utilization by the motor as a precisely controlled alternating current to operate the motor and precisely control its speed.

4. An improved system for operating and precisely controlling the speed of at least one synchronous electric motor comprising a first power source means for producing a high energy high unregulated frequency continuous series of direct current pulses with a frequency average of greater than 400 c.p.s., an electronic semiconductor switching means having input and output terminals and a control electrode, means for connecting said first means to said input terminal of said switching means, a second power source means for producing a low energy electrical signal of precisely regulated frequency of less than one fourth the frequency average of said direct current pulses, means for connecting said second power source means to said control electrode so that application of said signal thereto causes said switching means to convert the continuous input signal into an output consisting of a series of precisely timed groups of closely spaced finite direct current pulses, means directly connecting said output terminal of said switching means to the windings of at least one synchronous electric motor so that said output will drive and accurately control the speed of the motor.

5. The improved system of claim 4 in which the switching means comprises at least one transistor element.

6. The improved system of claim 4 in which the switching means comprises at least one silicon controlled rectifier element.

7. An improved apparatus for generating a desired final high energy alternating current power signal of a given substantially constant frequency, comprising first electrical means for producing a continuous series of high energy finite unidirectional pulses having substantial frequency variation and a frequency average of at least four times that of the desired final signal, second electrical means for generating a low energy alternating current signal with a precisely controlled frequency equal to the desired given constant frequency, electrical switching means for periodically interrupting said continuous series of pulses to form a series of precisely timed groups of finite pulses in accordance with said precisely controlled frequency signal, and third electrical means for smoothing said series of groups of pulses into a high energy alternating current with a substantially constant frequency equal to the frequency of the low energy signal.

8. An improved system for producing a high energy regulated frequency alternating current from a high energy unregulated frequency alternating current, comprising first electrical means for rectifying unregulated frequency alternating current to a continuous series of finite high energy direct current pulses, electrical switching means connected to said first means for chopping said continuous series of direct current pulses into a precisely timed and spaced series of groups of finite direct current pulses, the spacing corresponding to a frequency at most about one fourth of the frequency average of the unregulated frequency current, and second electrical means operatively connected in a circuit with said switching means smoothing said spaced series of groups of D.C. pulses into high energy A.C. current of precisely regulated frequency.

9. An improved system for producing a high energy regulated frequency A.C. current comprising a first electrical means operatively connected in a circuit to apply a high energy, unregulated high frequency continuous series of finite D.C. voltage pulses across the input and output terminals of an electronic valve means having a control electrode, a second electrical means operatively connected to said valve means to apply precise lower frequency low energy A.C. power, having a frequency not substantially greater than one fourth the frequency average of the D.C. pulses, to the control electrode to create a series of precisely timed groups of closely spaced D.C. pulses and third electrical means operatively connected to said valve means for receiving said groups of pulses and integrating said series of groups of D.C. pulses into high energy A.C. power of precisely regulated frequency.

No references cited.